Patented Jan. 5, 1954

2,665,275

UNITED STATES PATENT OFFICE 2,665,275

2,4-DIAMINO-7,8-DISUBSTITUTED PTERIDINES

Norman Robert Campbell, Hertford, Maurice Edward Hugh Fitzgerald, Shirley, Croydon, and Henry Oswald Jackson Collier, Hoddesdon, England, assignors to Allen & Hanburys Limited, London, England, a British company No Drawing. Application October 17, 1950, Serial No. 190,656

Claims priority, application Great Britain December 22, 1948

8 Claims. (Cl. 260—251.5)

This invention relates to anti-bacterial substances and a process for their manufacture and is more particularly concerned with certain novel pteridines and is a continuation-in-part of an application Serial No. 133,222 filed December 15, 1949, now abandoned.

It is an object of the invention to provide novel pteridines having especially favourable anti-bacterial properties particularly against the organism Vibrio cholerae and/or are antagonists of pteroylglutamic acid.

It is a further object of the invention to provide a novel process for the manufacture of these novel pteridines.

The novel pteridines according to the invention have the general formula

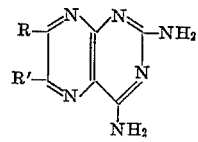

where R is a radical selected from the group consisting of alkyl radicals containing from two to eight carbon atoms, the benzyl radical, the anisyl radical and the cyclohexylmethyl radical and R' is a radical selected from the group consisting of alkyl radicals containing from two to eight carbon atoms, the benzyl radical, the anisyl radical and the cyclohexylmethyl radical.

In accordance with the present invention the novel pteridines may be manufactured by condensing 2,4,5,6-tetraminopyrimidine or an acid salt thereof preferably the bisulphite with an α-diketone on the general formula

where R is a radical selected from the group consisting of alkyl radicals containing from two to eight carbon atoms, the benzyl radical, the anisyl radical and the cyclohexylmethyl radical and R' is a radical selected from the group consisting of alkyl radicals containing from two to eight carbon atoms, the benzyl radical, the anisyl radical and the cyclohexylmethyl radical.

The reaction may be carried out in an acid or an alkaline medium or in the presence of an organic base such as piperidine and it is preferred to carry out the process in the presence of an alkali metal carbonate particularly sodium or potassium bicarbonate.

Example 1

One gm.-mol. of dipropionyl was mixed with one gm.-mol. of 2,4,5,6-tetraminopyrimidine acetate and 2.5 litres of 60% acetic acid and the whole boiled for 2 hours under reflux. The mixture was cooled and poured into 20 litres of water, the pH adjusted to approximately 6.0 and the solid product collected by filtration. The product was purified by recrystallisation from ethanol and treatment with decolorising charcoal. The purified product was 6,7-diethyl-2,4-diaminopteridine of melting point 280° C. and was a pale yellow solid.

Example 2

One gm.-mol. of di-isobutyryl was mixed with one gm.-mol. of 2,4,5,6-tetraminopyrimidine acetate and 2.5 litres of 60% acetic acid and the whole boiled for 2 hours under reflux. The mixture was cooled and poured into 20 litres of water, the pH adjusted to approximately 6.0 and the solid product collected by filtration. The product was purified by recrystallisation from ethanol and treatment with decolorising charcoal. The purified product was 6,7-di-isopropyl-2,4-diaminopteridine of melting point 246° C. and was a pale yellow solid.

Example 3

One gm.-mol. of ethyl-4-methoxyphenyl diketone was mixed with one gm.-mol. of 2,4,5,6-tetraminopyrimidine acetate and 2.5 litres of 60% acetic acid, and the whole boiled for 2 hours under reflux. The mixture was cooled and poured into 20 litres of water, the pH adjusted to approximately 6.0 and the solid product collected by filtration. The product was purified by recrystallisation from ethanol and treatment with decolorising charcoal. The purified product was 6 - anisyl - 7 - ethyl (or 7-anisyl-6-ethyl) -2,4-diaminopteridine of melting point 228° C. and was a pale yellow solid.

Ethyl-4-methoxyphenyl diketone is prepared as follows: The method employed is based on that given in Organic Syntheses Coll., vol. 2, for the preparation of isonitroso-propiophenone and also on the method of Pechmann and Muller (Ber.

21, 2119; 22, 2128) for the preparation of methylphenyl diketone.

To a solution of 4-methoxybutyrophenone (40.5 gms.) in ether (200 ml.) amyl nitrite (28.5 ml.) was added at a rate sufficient to keep the ether refluxing. The reaction mixture was stirred vigorously and a rapid stream of hydrogen chloride gas was passed into it.

After the addition of the amyl nitrite, the mixture was cooled, washed with a little water and extracted with 10% sodium hydroxide solution. The alkaline extract was freed from ether under reduced pressure on the water-bath, cooled and poured into a slight excess of concentrated hydrochloric acid mixed with ice.

The crude α-isonitroso 4-methoxy-n-butyrophenone was converted to the diketone by suspending it in 5% sulphuric acid (600 ml.) and steam distilling. The distillate was extracted with benzene and the extract washed with sodium carbonate solution, dried and distilled.

The diketone weighed 9 gms. and was a yellow liquid, boiling point 155° C./11 mm.

*Example 4*

One gm.-mol. of isopropyl-4-methoxyphenyl diketone was mixed with one gm.-mol. of 2,4,5,6-tetraminopyrimidine acetate and 2.5 litres of 60% acetic acid and the whole boiled for 2 hours under reflux. The mixture was cooled and poured into 20 litres of water, the pH adjusted to approximately 6.0 and the solid product collected by filtration. The product was purified by recrystallization from ethanol and treatment with decolorising charcoal. The purified product was 6-anisyl-7-isopropyl (or 7-anisyl-6-isopropyl)-2,4-diaminopteridine of melting point 200° C. and was a pale yellow solid.

The method of preparing isopropyl-4-methoxyphenyl diketone is based on the method used for the preparation of ethyl-4-methoxyphenyl diketone.

4-methoxyisovalerophenone (307.5 gms.) was dissolved in ether (1.5 litres). Into this solution was passed a rapid stream of hydrogen chloride gas and at the same time a stream of methyl nitrite gas generated from sodium nitrite (132 gms.), methyl alcohol (85 ml.) and water (78 ml.) by the gradual addition of dilute sulphuric acid (1:2—210 ml.). The sulphuric acid was added at such a rate that the methyl nitrite produced kept the ether in the flask refluxing gently; the mixture was stirred rapidly.

When the addition was complete, the mixture was cooled and extracted with 10% sodium hydroxide solution after first washing with a little water. The sodium hydroxide extract was freed from ether under reduced pressure on the water-bath, cooled and poured into excess concentrated hydrochloric acid and ice.

The crude isonitroso - 4 - methoxyisovalerophenone was hydrolysed by suspending it in 25% sulphuric acid (2 litres) and steam distilling to obtain the diketone. The distillate was extracted with benzene and the extract washed with sodium carbonate solution, dried and distilled.

The yield of diketone was 54.7 gms. in the form of a yellow liquid, boiling point 115° C./0.1 mm.

*Example 5*

One gm.-mol. of anisil was mixed with one gm.-mol. of 2,4,5,6-tetraminopyrimidine acetate and 2.5 litres of 60% acetic acid and the whole boiled for 2 hours under reflux. The mixture was cooled and poured into 20 litres of water, the pH adjusted to approximately 6.0 and the solid product collected by filtration. The crude product was purified by extraction with hot water and with benzene and finally recrystallisation from aqueous pyridine. The purified product was 6,7-dianisyl - 2,4 - diaminopteridine of melting point 288° C. and was a yellow solid.

While in the above examples the condensation has been effected in an acid medium using 2,4,5,6-tetraminopyrimidine acetate in an acetic acid solution, the process is also operative using other salts such as the 2,4,5,6-tetraminopyrimidine bisulphite in an acid or alkaline medium, or 2,4,5,6-tetraminopyrimidine in an alkaline medium.

This is illustrated in the following example:

*Example 6.—Preparation of 6,7-di-isopropyl-2,4-diaminopteridine*

A mixture of tetra-aminopyrimidine bisulphite (3.3 gms.), 2,5-dimethyl hexan-3,4-dione (Ponzio, Gazz. 30, II, 26) (1.0 gms.), water (50 ccs.) sodium hydrogen carbonate (1.3 gms.), and ethanol (20 ccs.) was heated to boiling under a reflux condenser for one hour. The mixture was cooled, diluted with an equal quantity of water and the crude product collected by filtration. The crude material was purified by recrystallisation from alcohol. The purified product was obtained in 90% of the theoretical yield, as a crystalline-solid melting at 246° C.

For purposes of comparison the following new compounds were also made by the method described in Example 1:

6,7-di-n-propyl-2,4-diaminopteridine of melting point 200° C.
6,7-di-sec.-butyl-2,4-diaminopteridine of melting point 210° C.
6-phenyl-7-ethyl (or 7-phenyl-6-ethyl)-2,4-diaminopteridine of melting point 280° C.
6-phenyl-7-isopropyl (or 7-phenyl-6-isopropyl)-2,4-diaminopteridine of melting point 242° C.

All these above-mentioned compounds and also two known compounds, i. e., 6,7-dimethyl-2,4-diaminopteridine and 6,7-diphenyl-2,4-diaminopteridine, were tested against *Vibrio cholerae* in peptone water and the following values were obtained for the minimum inhibitory concentration after 24 hours against $10^3$ organisms:

| Pteridine (2, 4-diamino) | Minimum inhibitory concentration 24 hours |
|---|---|
| Dimethyl | 600 μg./ml. |
| Diphenyl | 300 μg./ml. |
| Diethyl | 20 μg./ml. |
| Di-n-propyl | 80 μg./ml. |
| Di-isopropyl | 10 μg./ml. |
| Di-sec.-butyl | 80 μg./ml. |
| Di-anisyl | 25 μg./ml. |
| Anisyl-ethyl | 40 μg./ml. |
| Anisyl-isopropyl | 40 μg./ml. |
| Phenyl methyl | 80 μg./ml. |
| Phenyl ethyl | partial at 80 μg./ml. |
| Phenyl isopropyl | 80 μg./ml. |

From these results it will be seen that the compounds 6,7-di-isopropyl-2,4-diaminopteridine, 6,7-di-ethyl-2,4-diaminopteridine and 6,7-di-anisyl-2,4-diaminopteridine are distinctly superior against *Vibrio chloreae* to the other compounds prepared and very much superior to the known compounds, which result could not be forecast from previous knowledge or a consideration of the structure of the compounds.

Some of the compounds of the present invention are antagonists of pteroylglutamic acid and thus are useful against organisms requiring pteroylglutamic acid.

The following compounds are useful in respect of this aspect of the invention.

6,7-di-n-propyl-2,4-diaminopteridine,
6,7-dibutyl-2,4-diaminopteridine,
6,7-di-isobutyl-2,4-diaminopteridine,
6,7-di-sec.-butyl-2,4-diaminopteridine,
6,7-di-n-amyl-2,4-diaminopteridine,
6,7-di-sec.-amyl-2,4-diaminopteridine,
6,7-di-cyclohexylmethyl-2,4-diaminopteridine,
6,7-di-benzyl-2,4-diaminopteridine, and
6,7-di-isopropyl-2,4-diaminopteridine.

The following examples illustrate the preparation of these compounds.

*Example 7.—Preparation of 6,7-di-n-butyl-2,4-diaminopteridine*

A mixture of tetra-aminopyrimidine bisulphite (2.2 gms.), decane-5,6-dione (Bloch, Lehr and Erlenmeyer, Helv. Chim. Acta, 1945, 28, 1406) (1.7 gms.), 60% aqueous acetic acid (50 ccs.) and ethanol (5 ccs.) was heated to boiling under a reflux condenser for three hours. The mixture was then poured into water (200 ccs.), the pH adjusted to approximately 7 by the addition of a solution of sodium hydroxide and the precipitated crude product collected by filtration. The crude material was recrystallised from aqueous alcohol. The purified product 6,7-di-n-butyl-2,4-diaminopteridine, was obtained in 40% of the theoretical yield as a pale yellow crystalline solid melting at 180° C.

*Example 8.—Preparation of 6,7-di-n-amyl-2,4-diaminopteridine*

A mixture of tetra-aminopyrimidine bisulphite (2.2 gms.), dodecane-6,7-dione (Bouveault, Bull. soc. chim., [3] 35, 652, ibid., [4] 3, 123), (2.0 gms.), 60% aqueous acetic acid (50 ccs.) and ethanol (5 ccs.) was heated to boiling under a reflux condenser for three hours. The mixture was then poured into water (200 ccs.), the pH adjusted to approximately 7 by the addition of a solution of sodium hydroxide and the precipitated crude product collected by filtration. The crude material was recrystallised from aqueous alcohol. The purified product, 6,7-di-n-amyl-2,4-diaminopteridine was obtained in 15% of the theoretical yield as a pale yellow crystalline solid melting at 160° C.

*Example 9.—Preparation of 6,7-di-isobutyl-2,4-diaminopteridine*

A mixture of tetra-aminopyrimidine bisulphite (2.2 gms.), 2,7-dimethyl octan-4,5-dione (Ponzio, Gazz. 31, 1, 463, J. prakt., [2] 63, 368) (1.7 gms.), 60% aqueous acetic acid (50 ccs.) and ethanol (5 ccs.) was heated to boiling under a reflux condenser for three hours. The mixture was then poured into water (200 ccs.), the pH adjusted to approximately 7 by the addition of a solution of sodium hydroxide and the precipitated crude product collected by filtration. The crude material was purified by chromatography in a mixture of chloroform and alcohol on a column of aluminium oxide and then recrystallised from aqueous alcohol. The purified product, 6,7-di-isobutyl-2,4-diaminopteridine was obtained in 30% of the theoretical yield as a pale yellow solid, melting at 218° C.

*Example 10.—Preparation of 6,7-di-n-propyl-2,4-diaminopteridine*

A mixture of tetra-aminopyrimidine bisulphite (2.2 gms.), octan-4,5-dione (Bouveault, Bull. soc. chim., [3] 35, 652) (1.42 gms.), 60% aqueous acetic acid (50 ccs.) and ethanol (5 ccs.) was heated to boiling under a reflux condenser for three hours. The mixture was then poured into water (200 ccs.), the pH adjusted to approximately 7 by the addition of a solution of sodium hydroxide and the precipitated crude product collected by filtration. The crude material was recrystallised from alcohol. The purified product, 6,7-di-n-propyl-2,4-diaminopteridine was obtained in 42% of the theoretical yield as a yellow crystalline solid melting at 202° C.

*Example 11.—Preparation of 6,7-dibenzyl-2,4-diaminopteridine*

A mixture of tetra-aminopyrimidine bisulphite (2.2 gms.), 1,4-diphenyl butan-2,3-dione (Ruggli and Zeller, Helv. Chem. Acta, 1945, 28, 741-6) (1.4 gms.), 60% aqueous acetic acid (50 ccs.) and ethanol (5 ccs.) was heated to boiling under a reflux condenser for three hours. The mixture was then poured into water (200 ccs.), the pH adjusted to approximately 7 by the addition of a solution of sodium hydroxide and the precipitated crude product collected by filtration. The crude material was recrystallised from alcohol. The purified product, 6,7-dibenzyl-2,4-diaminopteridine, was obtained in 20% of the theoretical yield as a yellow crystalline solid melting at 258° C. with decomposition.

*Example 12.—Preparation of 6,7-di-sec.-butyl-2,4-diaminopteridine*

4-hydroxy-3,6-dimethyloctan-5-one was prepared from ethyl sec-valerate in 72% yield by the general method described by Snell and McElvain (Org. Synth., 1943, Coll. vol. II, 114). It was obtained as a nearly colourless liquid boiling at 95-100° C. This hydroxyketone was oxidised to 3,6-dimethyloctan-4,5-dione in the following manner: 4-hydroxy-3,6-dimethyloctan-5-one (17 gms.) was mixed with cupric acetate (40 gms.), acetic acid (100 ccs.) and water (80 ccs.). The mixture was heated to boiling under a reflux condenser, with mechanical stirring, for two hours, then poured into water (500 ccs.). The mixture was extracted with benzene, the benzene extract washed by shaking with a solution of sodium carbonate and freed from water by prolonged standing over solid potassium carbonate. Removal of the benzene, by distillation, left a crude oily product, which was purified by distillation at reduced pressure. The purified product was obtained as a yellow oil, boiling at 67-70° C. at a pressure of 12 mm. The yield of product was 10 gms.

A mixture of tetra-aminopyrimidine (3.3 gms.), 3,6-dimethyloctan-4,5-dione, prepared as above (1.7 gms.), sodium hydrogen carbonate (1.3 gms.), water (50 ccs.) and ethanol (20 ccs.) was heated to boiling under a reflux condenser for one hour. The mixture was cooled, diluted with an equal volume of water and the crude product collected by filtration. The crude material was purified by recrystallisation from aqueous alcohol. The purified product, 6,7-di-sec.-butyl-2,4-diaminopteridine, was obtained in 53% of the theoretical yield, as a yellow crystalline solid melting at 210° C.

*Example 13.—Preparation of 6,7-di-sec.-amyl-2,4-diaminopteridine*

5-hydroxy-4,7-dimethyldecan-6-one was prepared from ethyl-sec.-caproate in 75% yield by the general method described by Snell and McElvain (Org. Synth., 1943, Coll. vol. II, 114). It was obtained as a nearly colourless oil boiling at 110–115° C. at 12 mm. This hydroxyketone was oxidised to 4,7-dimethyldecan-5,6-dione in the following manner: 5-hydroxy-4,7-dimethyldecan-6-one (20 gms.) was dissolved in acetic acid (70 ccs.) and the solution cooled in cold water. To this solution was slowly added a solution of chromium trioxide (7 gms.) in 50% aqueous acetic acid (14 ccs.). The mixture was poured into water (500 ccs.) and extracted with benzene. The benzene extract was washed with a solution of sodium carbonate and freed from water by prolonged standing over solid potassium carbonate. Removal of benzene, by distillation, left a crude, oily, product, which was purified by distillation at reduced pressure. The purified product (8 gms.) was obtained as a yellow oil, boiling at 95–100° C. at a pressure of 12 mms.

A mixture of tetra-aminopyrimidine bisulphite (6.6 gms.), 4,7-dimethyldecan-5,6-dione, prepared as above (4 gms.), sodium hydrogen carbonate (2.5 gms.), water (80 ccs.) and ethanol (20 ccs.) was heated to boiling under a reflux condenser for three hours. The mixture was cooled, diluted with an equal volume of water and the crude product collected by filtration. The crude material was purified by recrystallisation of the hydrochloride from decinormal hydrochloric acid, the base being regenerated by treatment of the hydrochloride with a hot solution of sodium hydrogen carbonate and recrystallised from alcohol. The purified product was obtained in 14% of the theoretical yield, as a crystalline solid melting at 172° C.

*Example 14.—Preparation of 6,7-di-cyclohexylmethyl-2,4-diaminopteridine*

2-hydroxy-1,4-dicyclohexylbutan-3-one was prepared from ethyl cyclohexylacetate in 68% yield by the general method described by Snell and McElvain (Org. Synth., 1943, Coll. vol II, 114). It was obtained as a nearly colourless liquid, boiling at 170–180° C. at a pressure of 0.3 mm. This hydroxyketone was oxidised to 1,4-di-cyclohexylbutan-2,3-dione in the following manner: 2-hydroxy-1,4-dicyclohexylbutan-3-one, prepared as above (20 gms.) was dissolved in acetic acid (50 ccs.); to this solution was added, slowly, a solution of chromium trioxide (8 gms.) in a mixture of water (8 ccs.) and acetic acid (20 ccs.). The mixture was then poured into water (500 ccs.) and extracted with benzene. The benzene extract was washed with a solution of sodium carbonate and freed from water by prolonged standing over solid potassium carbonate. Removal of benzene, by distillation, left a crude oily product, which was purified by distillation at reduced pressure. The purified product (12 gms.) was obtained as a yellow oil, boiling at 100° C. at a pressure of 0.05 mm., later solidifying to a solid melting at 52° C.

A mixture of tetra-aminopyrimidine bisulphite (2.6 gms.), 1,4-di-cyclohexylbutan-2,3-dione (prepared as above) (1.95 gms.), sodium hydrogen carbonate (1 gm.), water (40 ccs.) and alcohol (16 ccs.) was heated to boiling under a reflux condenser for one hour. The mixture was cooled, diluted with an equal volume of water and the crude product collected by filtration. The crude material was purified by recrystallisation from alcohol. The purified product was obtained in 22% of the theoretical yield, as a crystalline solid melting at 230° C.

The compounds referred to above were tested for their activity as antagonists of pteroylglutamic acid as compared with "Aminopterin" (4-amino-pteroylglutamic acid) which is a powerful "Folic Acid" antagonist for the organism *Streptococcus faecalis*. In the following table the comparative activities are given as compared with 4-aminopteroylglutamic acid taken as unity.

| Substance: | Activity |
|---|---|
| 4-amino-pteroylglutamic acid | 1 |
| 6,7-dibenzyl-2,4-diaminopteridine | 25 |
| 6,7-di-n-propyl-2,4-diaminopteridine | 2 |
| 6,7-di-isopropyl-2,4-diaminopteridine | 4 |
| 6,7-di-n-butyl-2,4-diaminopteridine | 9 |
| 6,7-di-isobutyl-2,4-diaminopteridine | 3 |
| 6,7-di-sec-butyl-2,4-diaminopteridine | 4 |
| 6,7-di-n-amyl-2,4-diaminopteridine | 8 |
| 6,7-di-sec-amyl-2,4-diaminopteridine | 5 |
| 6,7-di-cyclohexylmethyl-2,4-diaminopteridine | 4 |

What we claim is:

1. Pteridines of the general formula

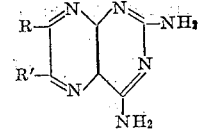

where R is a radical selected from the group consisting of alkyl radicals containing from two to eight carbon atoms, the benzyl radical, the anisyl radical and the cyclohexylmethyl radical and R' is a radical selected from the group consisting of alkyl radicals containing from two to eight carbon atoms, the benzyl radical, the anisyl radical and the cyclohexylmethyl radical.

2. As a new chemical compound 6,7-di-isopropyl-2,4-diaminopteridine.

3. As a new chemical compound, 6,7-di-n-butyl-2,4-diaminopteridine.

4. As a new chemical compound, 6,7-di-n-amyl-2,4-diaminopteridine.

5. As a new chemical compound 6,7-di-isobutyl-2,4-diaminopteridine.

6. As a new chemical compound 6,7-di-benzyl-2,4-diaminopteridine.

7. A process for the manufacture of pteridines of the general formula

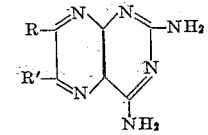

where R is a radical selected from the group consisting of alkyl radicals containing from two to eight carbon atoms, the benzyl radical, the anisyl radical and the cyclohexylmethyl radical R' is a radical selected from the group consisting of alkyl radicals containing from two to eight carbon atoms, the benzyl radical, the anisyl radical and the cyclohexylmethyl radical, which comprises condensing a compound selected from the group consisting of 2,4,5,6-tetraminopyrimidine and its acid salts with an α-diketone of the general formula

where R is a radical selected from the group consisting of alkyl radicals containing from two to eight carbon atoms, the benzyl radical, the anisyl radical and the cyclohexylmethyl radical and R' is a radical selected from the group consisting of alkyl radicals containing from two to eight carbon atoms, the benzyl radical, the anisyl radical and the cyclohexylmethyl radical.

8. A process for the manufacture of pteridines of the general formula

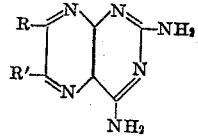

where R is a radical selected from the group consisting of alkyl radicals containing from two to eight carbon atoms, the benzyl radical, the anisyl radical and the cyclohexylmethyl radical and R' is a radical selected from the group consisting of alkyl radicals containing from two to eight carbon atoms, the benzyl radical, the anisyl radical and the cyclohexylmethyl radical, which comprises condensing 2,4,5,6-tetraminopyrimidine bisulphite with an α-diketone of the general formula

where R is a radical selected from the group consisting of alkyl radicals containing from two to eight carbon atoms, the benzyl radical, the anisyl radical and the cyclohexylmethyl radical and R' is a radical selected from the group consisting of alkyl radicals containing from two to eight carbon atoms, the benzyl radical and the anisyl radical in the presence of an alkali metal carbonate and the cyclohexylmethyl radical.

NORMAN ROBERT CAMPBELL.
MAURICE EDWARD HUGH FITZGERALD.
HENRY OSWALD JACKSON COLLIER.

References Cited in the file of this patent

UNITED STATES PATENTS

| Number | Name | Date |
|---|---|---|
| 2,581,889 | Timmis | Jan. 8, 1952 |

OTHER REFERENCES

Mallette et al., J. Am. Chem. Soc., 69, 1814–1816 (1947).